United States Patent
Soldati et al.

(10) Patent No.: US 9,203,582 B2
(45) Date of Patent: Dec. 1, 2015

(54) METHODS AND NODES IN A WIRELESS COMMUNICATION SYSTEM

(71) Applicant: Huawei Technologies Co., Ltd., Shenzhen (CN)

(72) Inventors: Pablo Soldati, Kista (SE); Branislav Popovic, Kista (SE); Weijun Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 14/206,733

(22) Filed: Mar. 12, 2014

(65) Prior Publication Data

US 2014/0192770 A1  Jul. 10, 2014

Related U.S. Application Data

(63) Continuation of application No. PCT/EP2012/069274, filed on Sep. 28, 2012.

(51) Int. Cl.
*H04L 5/00* (2006.01)
*H04L 1/00* (2006.01)

(52) U.S. Cl.
CPC ............ *H04L 5/0037* (2013.01); *H04L 1/0038* (2013.01); *H04L 5/0016* (2013.01); *H04L 5/0048* (2013.01); *H04L 5/0053* (2013.01); *H04L 5/0094* (2013.01); *H04L 5/001* (2013.01)

(58) Field of Classification Search
CPC ........................... H04W 72/042; H04L 5/0053
See application file for complete search history.

(56) References Cited

U.S. PATENT DOCUMENTS

| | | | |
|---|---|---|---|
| 8,964,678 B2* | 2/2015 | Anderson et al. | 370/329 |
| 2014/0071915 A1* | 3/2014 | Papasakellariou et al. | 370/329 |
| 2014/0071935 A1* | 3/2014 | Papasakellariou et al. | 370/330 |
| 2015/0200741 A1* | 7/2015 | Liu et al. | 370/329 |

FOREIGN PATENT DOCUMENTS

WO   2012109542 A1   8/2012

OTHER PUBLICATIONS

"3rd Generation Partnership Project: Technical Specification Group Radio Access Network; Evolved Universal Terrestrial Radio Access (E-UTRA); Physical layer procedures (Release 10)," 3GPP TS 36.213 V10.7.0, Technical Specification, Sep. 2012, 126 pages.
International Search Report and Written Opinion of Patent Cooperation Treaty (PCT), Application No. PCT/EP2012/069274, date of mailing Aug. 30, 2013, 18 pages.
"Design of enhanced PDCCH in Rel-11," 3GPP TSG RAN WG1 Meeting #66, R1-112119, Source: CATT, Discussion and Decision, Athens, Greece, Aug. 22-26, 2011, 4 pages.
"Discussion on ePDCCH Design Issues," 3GPP TSG-RAN1 #66 meeting, R1-112517, Source: Samsung, Discussion, Athens, Greece, Aug. 22-26, 2011, 4 pages.

(Continued)

*Primary Examiner* — Shaq Taha
(74) *Attorney, Agent, or Firm* — Slater & Matsil, L.L.P.

(57) ABSTRACT

Methods and nodes, for communication of a receiver-specific control channel signal within a wireless communication system, to be received by a receiver, wherein receiver-specific downlink control channel signals are scheduled for transmission over sets of Physical Resource Block pairs.

15 Claims, 6 Drawing Sheets

(56) References Cited

OTHER PUBLICATIONS

"On enhanced PDCCH design," 3GPP TSG-RAN WG1 #66bis, R1-112928, Source: Ericsson, ST-Ericsson, Discussion and Decision, Zhuhai, China, Oct. 10-14, 2011, 3 pages.

"Design Consideration for E-PDCCH," 3GPP TSG WG1 Meeting #66 bis, R1-113236, Source: Research in Motion, UK Limited, Discussion and Decision, Zhuhai, China, Oct. 10-14, 2011, 5 pages.

"Design details for enhanced PDCCH," 3GPP TSG RAN WG1 #66bis, R1-113322, Source: Alcatel-Lucent, Alcatel-Lucent Shanghai Bell, Discussion and Decision, Zhuhai, China, Oct. 10-14, 2011, 5 pages.

"DM-RS based Distributed and Localized E-PDCCH structure," 3GPP TSG RAN WG1 #67, R1-114239, Source: Samsung, Discussion and Decision, San Francisco, USA, Nov. 14-18, 2011, 4 pages.

"Final Report of 3GPP TSG RAN WG1 #67 v1.0.0 (San Francisco, USA, Nov. 14-18, 2011)," 3GPP TSG RAN WG1 Meeting #68, R1-120001, Source: MCC Support, Dresden, Germany, Feb. 6-10, 2012, 89 pages.

"DCI Multiplexing for E-PDCCH," 3GPP TSG RAN WG1 Meeting #68, R1-120257, Discussion/Decision, NEC Group, Dresden, Germany, Feb. 6-10, 2012, 7 pages.

"DMRS sequences for ePDCCH," 3GPP TSG RAN WG1 meeting #68, R1-120870, Source: Huawei, HiSilicon, Discussion and decision, Dresden, Germany, Feb. 6-10, 2012, 8 pages.

"Scrambling sequences for ePDCCH detection," 3GPP TSG RAN WG1 meeting #68bis, R1-120993, Source: Huawei, Discussion and decision, Jeju, Korea, Mar. 26-30, 2012, 7 pages.

"On ePDCCH Search Space Design Supporting Localized and Distributed Transmission," 3GPP TSG RAN WG1 Meeting #69, R1-122309, Source: LG Electronics, Discussion and Decision, Prague, Czech Republic, May 21-25, 2012, 11 pages.

"On the reuse of ePDCCH resources," 3GPP TSG RAN WG1 Meeting #68bis, R1-122607, Source: Nokia, Nokia Siemens Networks, Discussion and decision, Prague, Czech Republic, May 21-25, 2012, 5 pages.

"Final Report of 3GPP TSG RAN WG1 #69 v1.0.0 (Prague, Czech Republic, May 21-25, 2012)," 3GPP TSG RAN WG1 Meeting #70, R1-123081, Source: MCC Support, Qingdao, People's Republic of China, Aug. 13-17, 2012, 9 pages.

Configuration of UE-specific RS for ePDCCH, 3GPP TSG RAN WG1 Meeting #68, Rq-120279, Source: Sharp, Discussion, Dresden, Germany, Feb. 6-10, 2012, 7 pages.

\* cited by examiner

METHODS AND NODES IN A WIRELESS COMMUNICATION SYSTEM

This application is a continuation of International Application No. PCT/EP2012/069274, filed on Sep. 28, 2012 which is hereby incorporated by reference in its entirety.

FIELD OF INVENTION

Implementations described herein relate generally to a radio network node, a method in a radio network node, a receiver and a method in a receiver. In particular is herein described a mechanism for signaling and detecting of control channel resources within a wireless communication system.

BACKGROUND OF INVENTION

A receiver, also known as User Equipment (UE), mobile station, wireless terminal and/or mobile terminal is enabled to communicate wirelessly in a wireless communication system, sometimes also referred to as a cellular radio system. The communication may be made e.g. between two receivers, between a receiver and a wire connected telephone and/or between a receiver and a server via a Radio Access Network (RAN) and possibly one or more core networks.

The receiver may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication system covers a geographical area which is divided into cell areas, with each cell area being served by a radio network node, or base station e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One radio network node, situated on the base station site, may serve one or several cells. The radio network nodes communicate over the air interface operating on radio frequencies with the receivers within range of the respective radio network node.

In some radio access networks, several radio network nodes may be connected, e.g. by landlines or microwave, to a Radio Network Controller (RNC) e.g. in Universal Mobile Telecommunications System (UMTS). The RNC, also sometimes termed Base Station Controller (BSC) e.g. in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), radio network nodes, which may be referred to as eNodeBs or eNBs, may be connected to a gateway e.g. a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction i.e. from the receiver to the radio network node.

The downlink of contemporary wireless systems, such as the 3GPP Long Term Evolution (LTE) cellular communication system, is based on Orthogonal Frequency Division Multiplex (OFDM) transmission, which uses time and frequency resource units for transmission. OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier. The smallest time-frequency resource unit, called resource element (RE), comprises a single complex sinusoid frequency (sub-carrier) in an OFDM symbol. For the purpose of scheduling transmissions to the different receivers/UEs, the resource elements are grouped into larger units called Physical Resource Blocks (PRBs). A PRB occupies a half of a subframe, called "slot", consisting of six or seven consecutive OFDM symbol intervals in time domain (0.5 millisecond in total), and twelve consecutive sub-carrier frequencies in frequency domain (180 kHz in total). Each PRB is indicated by a unique index: $n_{PRB} \in [0, N_{RB}^{DL}-1]$ denoting the position of the sub-band that the PRB occupies within a given bandwidth, where $N_{RB}^{DL}-1$ is the total number of PRB within the bandwidth. The maximum number of PRBs $N_{RB}^{max,DL}$, associated with the largest LTE bandwidth (20 MHz), is 110. The relation between the PRB number $n_{PRB}$ in the frequency domain and resource elements (k,l) in a slot is $n_{PRB} = \lfloor k/N_{sc}^{RB} \rfloor$.

The LTE Rel-8/10 defines a Physical Downlink Control Channel (PDCCH) as a signal containing information needed to receive and demodulate the information transmitted from the radio network node/eNodeB to a receiver/UE through the Physical Downlink Shared Channel (PDSCH). PDSCH is performed over 1 ms duration (which is also referred to as a subframe) on one or several RBs and a radio frame consists of 10 subframes.

The PDCCH is transmitted in a control region that may occupy up to three OFDM symbols at the beginning of each subframe, whereas the remaining of the subframe forms the data region used for the transmission of the PDSCH channel.

The LTE Rel-11 supports a new control channel scheduled within the time-frequency resources of the downlink data region. Unlike the legacy LTE downlink common control channel PDCCH, this new feature, known as Enhanced Physical Downlink Control Channel (EPDCCH), has the distinct characteristic of using Demodulation Reference Signals (DMRS) for demodulation and, consequently, the capability to associate each EPDCCH with a specific receiver/UE, as DMRS are receiver-specific.

The EPDCCH structure is fundamentally different from that of the PDCCH, e.g., it is based on UE-specific demodulation reference signals instead of cell-specific reference signals. While the PDCCH is transmitted over the whole system bandwidth, the EPDCCH may be confined to a configurable UE-specific set of RBs (i.e., EPDCCH set) and the receiver/UE may be configured with multiple EPDCCH sets. Each EPDCCH set comprises a group of (e.g., 2, 4 and 8) Physical Resource Block (PRB) pairs and each PRB pair comprises a set of (e.g., 16) Enhanced Resource Element Groups (EREGs). In turn, the set of REGs in a PRB pair constitute Enhanced CCEs (ECCEs). The number of ECCEs per PRB pair may typically be 2 or 4 (i.e., corresponding to 8 and 4 EREGs, respectively), depending on the subframe type, i.e., it may be time-varying. Depending on the radio link conditions, an EPDCCH may be transmitted on a set of ECCEs, e.g., 1, 2, 4, 8, 16 or 32 ECCEs, located either within one or a few PRB pairs (i.e., localized transmission), or on all PRB pairs of the EPDDCH set (i.e., distributed transmission). The ECCEs are enumerated per each EPDCCH set. The EPDCCH also supports Multi-User Multiple Input Multiple Output (MU-MIMO), such that several EPDCCHs could be transmitted on the same set of ECCEs using different antenna ports.

For EPDCCH demodulation, four DMRS antenna ports {7, 8, 9, 10} may be used, as stated in 3GPP TSG Ran WG1, "Final Report of 3GPP TSG RAN WG1 #67 v1.0.0", R1-120001, February, 2012. In order to reduce the detection complexity, the antenna port used for EPDCCH transmission shall be known to the receiver/UE. One way to indicate the used antenna ports to the receiver/UE is an implicit association between antenna ports and useful ECCEs. Several methods for antenna port associations have been discussed, and the latest agreement is that with localized allocation, each ECCE index is associated by specification with one antenna port, see 3GPP TSG Ran WG1, "Final Report of 3GPP TSG RAN WG1 #69 v0.2.0", R1-12381 June 2012.

The EPDCCH transmission can be either localized or distributed with the granularity of one PRB pair. With localized transmission, the EPDCCH for a receiver/UE is typically transmitted over a single PRB pair scheduled by the associated radio network node/eNodeB based on CQI feedback information (frequency selective scheduling); with distributed transmission, the EPDCCH is transmitted over multiple PRB pairs to achieve frequency diversity. The latter scheme is useful if there is no feedback or the available feedback is not reliable, although more resources (i.e. PRBs) are locked for EPDCCH transmission.

The EPDCCH design exploits a receiver/UE specifically configured search space. For a given receiver/UE, the serving radio network node (such as e.g., eNodeB in LTE) may configure one or multiple sets of Physical Resource Block (PRB) pairs (EPDCCH sets in LTE terminology) that can be used to transmit the downlink control channel signals to the receiver/UE. Each EPDCCH set can be configured for either localized or distributed EPDCCH transmission. A distributed EPDCCH transmission shall use all PRB pairs within an EPDCCH set, while for localized EPDCCH transmission, the EPDCCH shall be transmitted over one or more PRB pairs within an EPDCCH set. The unit block for EPDCCH multiplexing and blind decoding is the Enhanced Control Channel Element (ECCE), which consists of a block of resource elements in a PRB pair. When EPDCCH is transmitted, one, two or four ECCEs can be aggregated together based on the payload size and coding rate of the transmitted EPDCCH creating aggregation levels of one, two or four, respectively. Therefore, one PRB pair can contain one or more ECCE depending on the ECCE size and the mapping rule used to map EPDCCH to the PRB pair.

A relevant design aspect yet to be specified for the LTE Rel-11 is the receiver's EPDCCH searching procedure within its search space, i.e. within the EPDCCH sets configured for said receiver/UE. Further, the control channel signal can be transmitted either in a distributed or a localized manner. The current LTE design implies that a number of blind decoding attempts shall be configured for EPDCCH detection. The overall number of allowed blind decoding attempts shall then be split among all configured EPDCCH sets for a receiver/UE. How the available decoding attempts shall be split among the EPDCCH sets or the total amount of blind decoding attempts allowed for a receiver/UE are not solved. Further, how multiple EPDCCHs can be multiplexed together within a set, how the total number of allowed blind decoding attempts for a receiver/UE shall be split among different sets of different size (i.e., in terms of number of PRB pairs), and more generally the control channel searching procedure for the receiver/UE, are still open issues.

The issue to be resolved is how to design an EPDCCH transmission scheme that can enable an efficient EPDCCH search that minimizes the number of blind decoding attempts at the receiver/UE while ensuring reliable detection of the control channel signals.

In one solution described in Ericsson, ST-Ericsson, "On Enhanced PDCCH Design", R1-112928, Zhuhai, China, Oct. 10-14, 2011, the frequency location for the EPDCCH is indicated by a new Downlink Control Information (DCI) format transmitted in the Physical Downlink Control Channel (PDCCH) region. This hierarchical design implies that a receiver/UE first performs blind detection in the PDCCH region to find the new DCI format, and then determines whether there is EPDCCH in the data region according to the status of the new DCI format detection. This solution relies on explicit signaling of scheduled EPDCCH time-frequency resources (via PDCCH), and it does not comply with the latest EPDCCH search-space design.

The current LTE design specifies that a receiver/UE will be configured with a fixed number of allowed blind decoding attempts for searching its control channel signals within its search-space. The total number of allowed blind decoding attempts for a receiver/UE shall be split among different sets of different size (i.e., in terms of number of PRB pairs), and, unless a more specific searching rule is specified, a receiver/UE shall scan all the EPDCCH set configured for its EPDCCH transmission and perform a fixed number of blind decoding attempts in each set, regardless whether an EPDCCH signal is found or not. Although this method can assure the highest detection reliability (if a sufficient number of decoding attempts is performed in each set), it also requires high computational complexity at the receiver/UE and high energy consumption, see e.g., Huawei, HiSilicon, "DMRS sequences for EPDCCH", R1-120870, Dresden, Germany, 6-10 Feb. 2012, for a thorough analysis.

The alternative method proposed in Huawei, HiSilicon, "DMRS sequences for EPDCCH", R1-120870, Dresden, Germany, 6-10 Feb. 2012, consists in using an EPDCCH signature sequence to re-modulate the EPDCCH DMRS for all receivers/UEs. Such signature sequence can allow each receiver/UE to identify any PRB pair, within the configured search space, carrying either a single or multiple EPDCCHs (so-called "candidate EPDCCH PRB pairs", see Huawei, HiSilicon, "Scrambling sequence for EPDCCH detection", R1-120993, Jeju, Korea, Mar. 26-30, 2012), and then to perform blind decoding within each candidate PRB pair in order to find its own EPDCCH. The results in Huawei, HiSilicon, "DMRS sequences for EPDCCH", R1-120870, Dresden, Germany, 6-10 Feb. 2012, demonstrate that the number of operations for a single blind EPDCCH detection attempt is much larger than for a single DMRS signature sequence detection attempt. Hence, the average number of operations for an EPDCCH detection scheme based on DMRS signature sequences is dominated by the number of blind EPDCCH detection attempts which are made if the signature sequence detection fails and/or Cyclic Redundancy Check (CRC) fails. This method, however, could not be applied in case of distributed EPDCCH transmission, and does not take into account the latest EPDCCH search space design details.

Hence, it is a general problem to enable an improved method for detecting control channel resources at the receiver/UE.

SUMMARY OF INVENTION

It is therefore an object to obviate at least some of the above mentioned disadvantages and to improve the performance in a wireless communication system.

According to a first aspect, the object is achieved by a method in a radio network node, for communication of a receiver-specific control channel signal within a wireless communication system, to be received by a receiver. The receiver-specific downlink control channel signals are scheduled for transmission over sets of Physical Resource Block (PRB) pairs. The method comprises configuring at least one receiver-specific set of at least one PRB pair of time-frequency Resource Elements. Further, the method comprises also configuring a set of modulation signature sequences. Additionally, the method comprises configuring an alphabet of at least one symbol. Each symbol in the alphabet is associated with a modulation signature sequence in the configured set of modulation signature sequences. Also, the method comprises selecting, for each configured receiver-specific set of at least one PRB pair, at least one modulation signature sequence by selecting a receiver-specific codeword comprising a number of symbols from the configured alphabet. Furthermore, the method comprises transmitting at least one of the configured set of modulation signature sequences and the configured alphabet of symbols. Additionally, the method comprises selecting at least one set of at least one PRB pair for the transmission of a receiver-specific control channel signal. In further addition, the method comprises modulating the selected at least one receiver-specific set by applying the selected at least one modulation signature sequence. Also, in further addition, the method also comprises transmitting the receiver-specific control channel signal over the at least one modulated receiver-specific set of the at least one PRB pair.

According to a second aspect, the object is achieved by a radio network node, for communication of a receiver-specific control channel signal within a wireless communication system, to be received by a receiver. The receiver-specific downlink control channel signals are scheduled for transmission over sets of PRB pairs. The radio network node comprises a processing circuit, adapted for configuring at least one receiver-specific set of at least one PRB pair of time-frequency Resource Elements. Also, the processing circuit is adapted for configuring a set of modulation signature sequences and for configuring an alphabet of at least one symbol. Each symbol in the alphabet is associated with a modulation signature sequence in the configured set of modulation signature sequences. Further the processing circuit is adapted for selecting, for each configured receiver-specific set of at least one PRB pair, at least one modulation signature sequence by selecting a receiver-specific codeword comprising a number of symbols from the configured alphabet. Additionally, the processing circuit is adapted for selecting at least one set of at least one PRB pair for the transmission of a receiver-specific control channel signal. Furthermore, the processing circuit is also adapted for modulating the configured receiver-specific set by applying the configured set of modulation signature sequences. Further, the radio network node comprises a transmitting unit, adapted for transmitting at least one of the configured set of modulation signature sequences, and/or the configured alphabet of symbols. Also, in addition, the transmitting unit is furthermore adapted for transmitting the receiver-specific control channel signal over the modulated receiver-specific set of the at least one PRB pair.

According to a third aspect, the object is achieved by a method in a receiver. The method is configured for detecting a set of PRB pairs used for the communication of a receiver-specific control channel signal. The method comprises receiving a receiver-specific control channel signal over a modulated receiver-specific set of at least one PRB pair. Furthermore, the method comprises identifying the set of PRBs pairs allocated by the radio network node for control channel signaling by searching within the at least one received receiver-specific set of at least one PRB pair for signature sequences. Additionally, the method further comprises demodulating the control channel signal in the identified set. Also, in further addition, the method comprises demodulating data received from the radio network node on a physical downlink data channel signal, by using information obtained from the demodulated control channel signal.

According to a fourth aspect, the object is achieved by a receiver. The receiver is configured for detecting a set of PRB pairs used for the communication of a receiver-specific control channel signal. The receiver comprises a receiving unit adapted for receiving a receiver-specific control channel signal over a modulated receiver-specific set of at least one PRB pair. Further, the receiver comprises a processing circuit adapted for identifying the set of PRBs pairs allocated by the radio network node for control channel signaling by searching within the at least one received receiver-specific set of at least one PRB pair. Further the processing circuit is adapted for demodulating the identified control channel signal. Also, the processing circuit is furthermore adapted for demodulating data received from the radio network node on a physical downlink data channel signal, by using information obtained from the demodulated control channel signal.

Some advantages according to embodiments herein comprises that network performance is enhanced while maintaining low signaling overhead. Using embodiments of the method, the receiver is enabled to discover the control channel elements received from the radio network node, faster and in a more reliable manner than in prior art. Thereby, the receiver is enabled to discover the control channel elements using less computing, which render less energy usage and prolonged battery lifetime of the receiver. Thus an improved performance within a wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION OF INVENTION

Embodiments of the invention described herein are defined as a radio network node, a method in a radio network node, a receiver and a method in a receiver, which may be put into practice in the embodiments described below. These embodiments may, however, be exemplified and realized in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
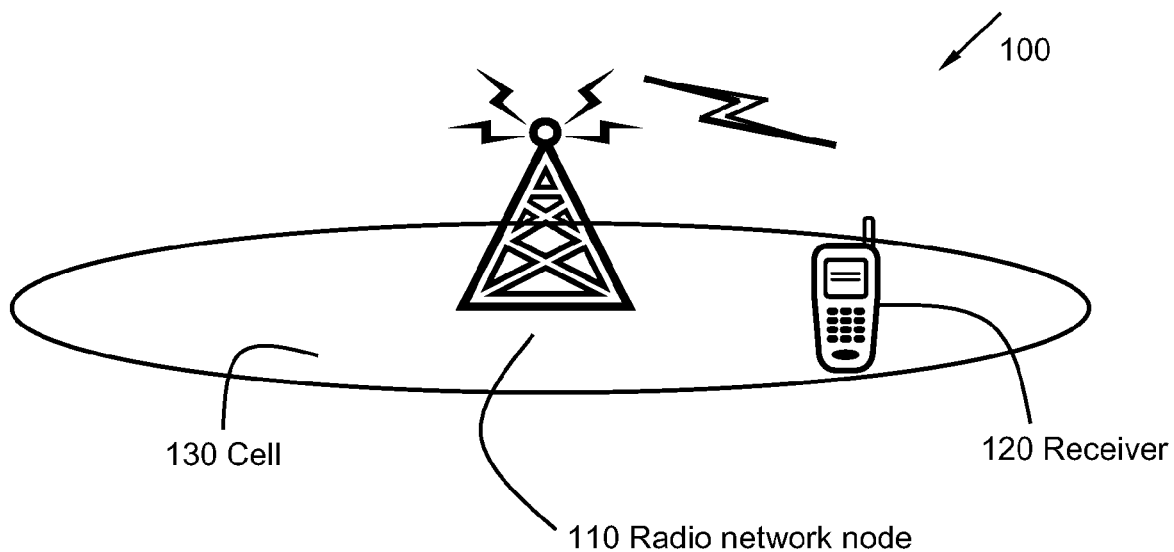
FIG. 1 is a block diagram illustrating an embodiment of the system wherein embodiments of the invention is implemented.

FIG. 1 is a schematic illustration over a wireless communication system 100. The wireless communication system 100 may at least partly be based on radio access technologies such as e.g. 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The wireless communication system 100 may be configured to operate according to the Time-Division Duplexing (TDD) principle, according to some embodiments.

TDD is an application of time-division multiplexing to separate uplink and downlink signals in time, possibly with a Guard Period situated in the time domain between the uplink and downlink signaling, as have previously been discussed.

However, according to some embodiments, the wireless communication system 100 may be configured to operate according to the Frequency-Division Duplexing (FDD) principle, according to some embodiments.

The purpose of the illustration in FIG. 1 is to provide a simplified, general overview of the methods and nodes, such as radio network node and receiver herein described, and the functionalities involved. The methods, radio network node and receiver will subsequently, as a non-limiting example, be described in a 3GPP/LTE environment, but the embodiments of the disclosed methods, radio network node and receiver may operate in a wireless communication system 100 based on another access technology such as e.g. any of the above enumerated. Thus, although the embodiments of the invention are described based on, and using the lingo of, 3GPP LTE systems, it is by no means limited to 3GPP LTE.

The illustrated wireless communication system 100 comprises a radio network node 110 and a receiver 120, which radio network node 110 is serving a cell 130.

The radio network node 110 controls the radio resource management within the cell 130, such as, e.g., allocating radio resources to the receiver 120 within the cell 130 and ensuring reliable wireless communication between the radio network node 110 and the receiver 120. The radio network node 110 may typically comprise an eNodeB, e.g., in an LTE-related wireless communication system 100.

The receiver 120 is configured to transmit radio signals comprising information to be received by the radio network node 110. Correspondingly, the receiver 120 is configured to receive radio signals comprising information transmitted by the radio network node 110.

The illustrated network setting of one receiver 120 and one radio network node 110 in FIG. 1 is to be regarded as a non-limiting example of an embodiment only. The wireless communication system 100 may comprise any other number and/or combination of radio network nodes 110 and/or receiver/s 120, although only one instance of a receiver 120 and a radio network node 110, respectively, are illustrated in FIG. 1, for clarity reasons. A plurality of receivers 120 and radio network nodes 110 may further be involved in some embodiments of the disclosed invention.

Thus whenever "one" or "a/an" receiver 120 and/or radio network node 110 is referred to in the present context, a plurality of receivers 120 and/or radio network nodes 110 may be involved, according to some embodiments.

The receiver 120 may be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary.

The radio network node 110 may according to some embodiments be referred to as e.g. base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 120 over a wireless interface, depending e.g. of the radio access technology and terminology used.

In the sequel, the terminology from the 3GPP LTE system (EPDCCH, ECCE, subframe, etc.) may occasionally be used but a skilled reader may interchangeably consider more general notions of channels and signals with the same functionality and properties.

Consider a downlink subframe in which a receiver-specific set of N physical resource block pairs is configured for the transmission of downlink control channel signals to the receiver 120. Without loss of generality, we refer to said set as the EPDCCH set. We further consider the transmission of receiver-specific control channel signals (e.g., EPDCCH) supported by receiver-specific demodulation reference signals (such as e.g., DMRS) transmitted within at least one PRB pair of the EPDCCH set. For an Antenna Port (AP) used in an EPDCCH set, L Resource Elements (REs) may be allocated in each PRB pair of the EPDCCH set to the transmission of the associated DMRS. In some non-limiting embodiments implemented in an LTE system, L=12. However, L may be set to other values in different implementations.

When P≥1 antenna ports are used in each PRB pairs of an EPDCCH set, associated with the configured set of N PRB pairs is a receiver-specific codeword $x=[x_0, x_1, \ldots, x_{N-1}]$ of length N·P symbols, where $x_i=[x_i^{(p)}]_{p=1}^{P}$ is a length-P vector and the symbol $x_i^{(p)}$ associated with the $p^{th}$ selected antenna port on the $i^{th}$ PRB pair of said N PRB pairs set belongs to an alphabet $A=\{a_k\}_{k=0}^{K-1}$ of K symbols.

Figure 2A:
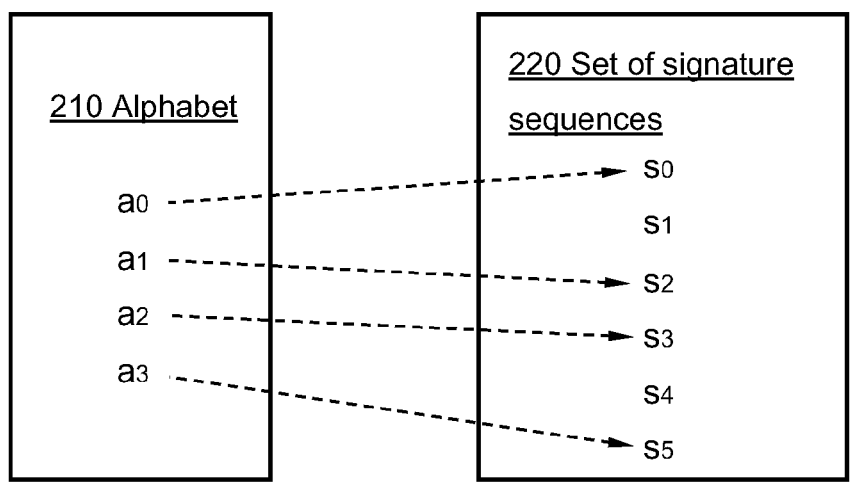
FIG. 2A is a block diagram illustrating an embodiment of the invention.

FIG. 2A illustrates an example of an embodiment wherein an alphabet 210 comprises four symbols a0, a1, a2, a3; (or expressed in another way: K=4 and A=[a0, a1, a2, a3]), which are associated with a signature sequence s0, s1, s2, s3, s4, s5 from a set 220 of signature sequences S. In total four out of the available six signature sequences may be used in a downlink Control Channel set, which also may be referred to as an EPDCCH set in the illustrated example.

Each symbol in the alphabet 210 $A=\{a_k\}_{k=0}^{K-1}$ is univocally associated with a signature sequence from the set 220 $S=\{s_m\}_{m=0}^{M-1}$ with $M \geq K$, where $s_m$ is the $m^{th}$ length-L signature sequence, such that no two symbols in the alphabet 210 A refer to the same signature sequence from the set 220 of sequences S. The association between symbols in alphabet 210 A and signature sequences in the set 220 S, may be different for different receivers 120 or same for all, or for a group of receivers 120 in the cell 130. The DMRS modulation sequence of the selected $p^{th}$ antenna port used for the transmission of the control channel signal within the i-th PRB pair of the EPDCCH set may be re-modulated using the signature sequence in the pool 220 of sequences S corresponding to symbol $x_i^{(p)}$ of the codeword.

According to some embodiments, receiver-specific signature sequences may be generated for EPDCCH, which signature sequences may be used to generate a new modulation sequence for EPDCCH signals by multiplying, symbol-by-symbol, an existing DMRS modulation sequence, such as e.g., the LTE DMRS modulation sequence for physical downlink shared channel (PDSCH), i.e. PDSCH-DMRS, with said receiver-specific EPDCCH signature sequence.

Figure 2B:
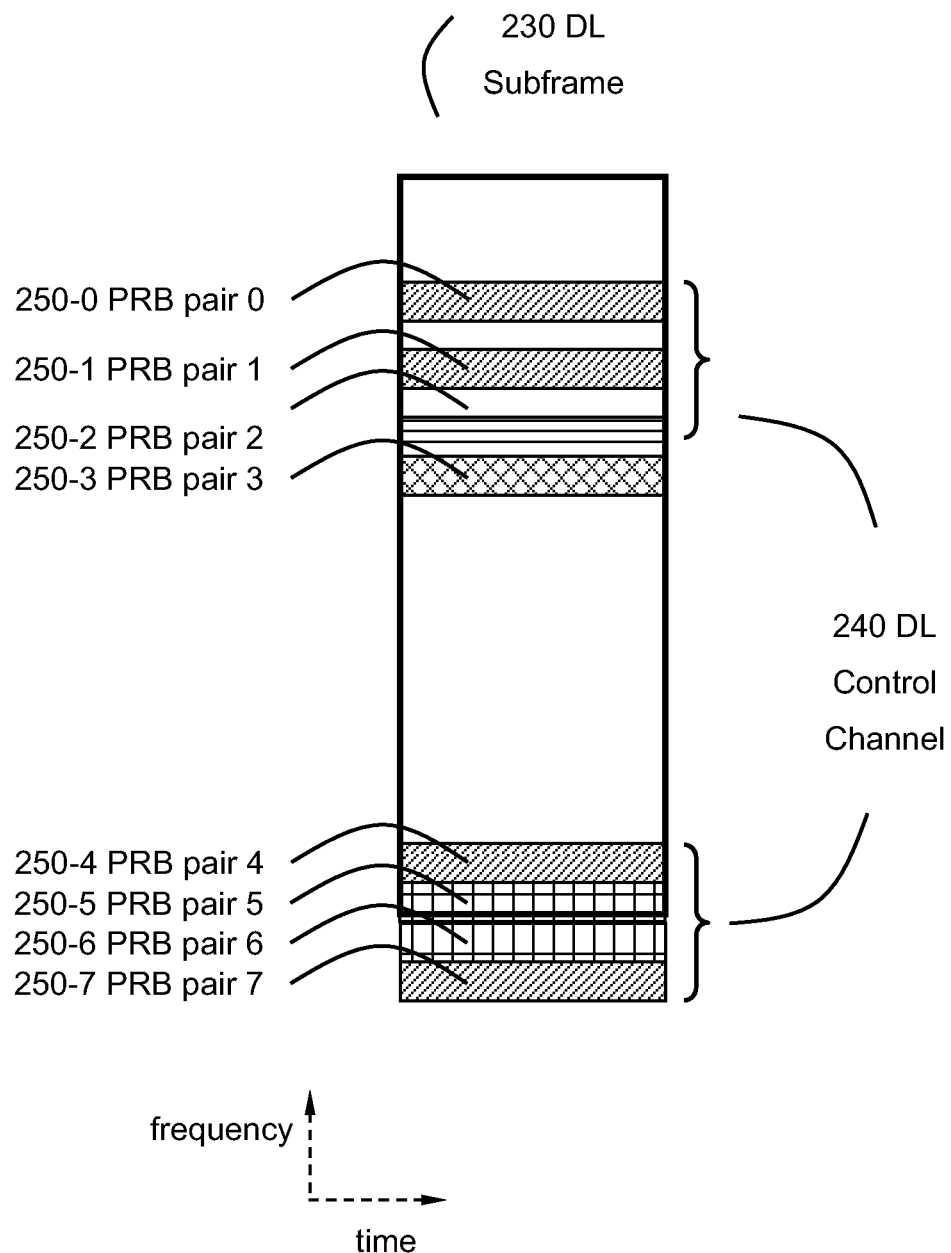
FIG. 2B is a block diagram illustrating an embodiment of the invention.

An embodiment of the signaling method disclosed herein is shown in FIG. 2B. In the figure, an example of a downlink subframe 230 is illustrated. The downlink subframe 230 comprises downlink control channel set 240, comprising eight PRB pairs 250-0, 250-1, 250-2, 250-3, 250-4, 250-5, 250-6, 250-7.

In FIG. 2B, a length-8 codeword may be used to assign different signature sequences to the N=8 PRB pairs 250-0, 250-1, 250-2, 250-3, 250-4, 250-5, 250-6, 250-7 of an EPDCH set 240. The receiver 120 may be configured with the mapping between alphabet symbols and signature sequences illustrated in FIG. 2A, and may be assigned a codeword for each EPDCCH set 240 configured.

In this merely illustrative and non-limiting example, each symbol of a 4-symbol alphabet 210; $A=\{a_0, a_1, a_2, a_3\}$ is univocally associated with a signature sequence in a set 220 of six signature sequences $S=\{s_0, s_1, \ldots, s_5\}$, as illustrated in FIG. 2A. Assuming an EPDCCH set 240 of N=8 PRB pairs 250-0, 250-1, 250-2, 250-3, 250-4, 250-5, 250-6, 250-7 may be configured for the receiver 120 and only single antenna port may be used on each of the said N PRB pairs 250-0, 250-1, 250-2, 250-3, 250-4, 250-5, 250-6, 250-7, a length-N codeword of symbols may be signaled to the receiver 120 indicating the assignment of signature sequences to each PRB pair 250-0, 250-1, 250-2, 250-3, 250-4, 250-5, 250-6, 250-7 in the configured EPDCCH set 240 when said set 240 is used by the radio network node 110 for the transmission of an EPDCCH signal for said receiver 120.

At the receiver side, the receiver 120 may know which antenna ports may possibly be used in each PRB pair 250-0, 250-1, 250-2, 250-3, 250-4, 250-5, 250-6, 250-7 of an EPDCCH set 240 by configuration signaling or in a specified way. Moreover, the receiver 120 is configured with the mapping between alphabet 210 of symbols and signature sequences, and it may also be assigned one codeword x, such as e.g. x=[a0, a0, a3, a2, a0, a1, a1, a0] as in the illustrated example, for each EPDCCH set 240 configured for its control channel transmission. With this information, the receiver 120 may be aware of which signature sequence has eventually been used for each of the used antenna ports in each and every PRB pair 250-0, 250-1, 250-2, 250-3, 250-4, 250-5, 250-6, 250-7 of a configured EPDCCH set 240 to modulate resource elements (REs) at fixed position in the PRB pair 250-0, 250-1, 250-2, 250-3, 250-4, 250-5, 250-6, 250-7 corresponding DMRS reference signals.

A non-limiting example of the EPDCCH searching procedure in the receiver 120 may comprise any, some or all of the following actions, according to different embodiments. In a first step, all received OFDM symbols within a subframe 230 may be decomposed into subcarriers with corresponding modulation symbols. In a second step, one EPDCCH set 240 of the configured EPDCCH sets 240 and the associated receiver-specific codeword x are chosen.

Additionally, in a third step, whether EPDCCH is potentially transmitted in the selected EPDCCH set 240 is detected in at least some of the following further sub steps (a)-(r).

In step (a), an un-processed PRB pair of the chosen EPDCCH set 240 is selected in the decomposed received signal.

In step (b) one un-processed antenna port out of the set of antenna ports is selected on the selected PRB pair 250-0, 250-1, 250-2, 250-3, 250-4, 250-5, 250-6, 250-7.

In step (c), the EPDCCH signature sequence for the selected antenna port is chosen on the selected PRB pair within the chosen EPDCCH set 240 according to codeword x.

In step (d), resource elements (REs) allocated to the transmission of demodulation reference signals (DMRS) of the selected antenna port are remodulated with the complex-conjugate of a known reference DMRS modulation sequence, (e.g., in the LTE systems, the DMRS modulation sequence used for physical downlink shared channel (PDSCH) transmission to said receiver 120, i.e. the PDSCH-DMRS). Such re-modulated REs may represent the first propagation channel estimate of the selected antenna port on the selected PRB pair 250-0, 250-1, 250-2, 250-3, 250-4, 250-5, 250-6, 250-7.

In step (e), the first propagation channel estimate is re-modulated with the complex-conjugate of the selected related e-PDCCH signature sequence, to obtain the second propagation channel estimate of the selected antenna port on the selected PRB pair 250-0, 250-1, 250-2, 250-3, 250-4, 250-5, 250-6, 250-7.

In step (f), all the samples of the first propagation channel estimate of the selected antenna port are summed, and then the (squared) absolute value of the sum is found, to obtain the first detection statistic of the selected antenna port on the selected PRB pair 250-0, 250-1, 250-2, 250-3, 250-4, 250-5, 250-6, 250-7.

In step (g), all the samples of the second propagation channel estimate of the selected antenna port is summed, and then the (squared) absolute value of the sum is found, to obtain the second detection statistic of the selected antenna port on the selected PRB pair 250-0, 250-1, 250-2, 250-3, 250-4, 250-5, 250-6, 250-7.

In step (h), if there is another unprocessed antenna port remained in the considered set of antenna ports, restart from step (b).

In step (i), all the first detection statistics of all APs on the selected PRB pair 250-0, 250-1, 250-2, 250-3, 250-4, 250-5, 250-6, 250-7 is summed to achieve the first detection statistic of the selected PRB pair 250-0, 250-1, 250-2, 250-3, 250-4, 250-5, 250-6, 250-7.

In step (j), all the second detection statistics of all APs on the selected PRB pair 250-0, 250-1, 250-2, 250-3, 250-4, 250-5, 250-6, 250-7 is summed to achieve the second detection statistic of the selected PRB pair 250-0, 250-1, 250-2, 250-3, 250-4, 250-5, 250-6, 250-7.

In step (k), if there is another un-processed PRB pair 250-0, 250-1, 250-2, 250-3, 250-4, 250-5, 250-6, 250-7 remained in the selected EPDCCH set 240, restart from step (a).

In step (l), all the first detection statistics of all PRB pairs 250-0, 250-1, 250-2, 250-3, 250-4, 250-5, 250-6, 250-7 within the selected EPDCCH set 240 is summed to achieve the first detection statistic of said EPDCCH set 240.

In step (m), all the second detection statistics of all PRB pairs 250-0, 250-1, 250-2, 250-3, 250-4, 250-5, 250-6, 250-7 within the selected EPDCCH set 240 is summed to achieve the second detection statistic of said EPDCCH set 240.

In step (n), the maximum detection statistic among first detection statistic and the second detection statistic of the selected EPDCCH set 240 is found.

In step (o), the maximum detection statistic is compared with an estimated noise-level threshold, to determine whether the observed EPDCCH set 240 contains a DMRS transmission.

In step (p), if the observed EPDCCH set 240 contains a DMRS transmission, it is determined, according to a maximum detection statistic, whether said DMRS sequence is equal to a reference DMRS sequence associated to the downlink transmission to the receiver 120 (e.g., in the LTE systems, the DMRS modulation sequence used for physical downlink shared channel (PDSCH)) or said DMRS sequence corresponds to the re-modulation of the reference DMRS sequence with a known modulation signature sequence; otherwise go to step (r).

In step (q), if the observed EPDCCH set 240 is detected as for EPDCCH transmission, it is regarded as one candidate EPDCCH set 240 over which a subsequent EPDCCH blind detection will be performed as in step 4.

In step (r), the procedure from the second step is repeated until all the EPDCCH sets 240 configured for the receiver 120 have been processed. In a fourth step, EPDCCH is detected in each of the detected candidate EPDCCH sets 240.

An advantage of some embodiments described herein, compared to prior art solutions is that an EPDCCH searching procedure is provided, that allows identifying not just a single PRB pair 250-0, 250-1, 250-2, 250-3, 250-4, 250-5, 250-6, 250-7 carrying an EPDDCH transmission, but rather the entire EPDCCH set 240 where the EPDCCH is transmitted. The receiver 120 may then perform blind decoding only within a candidate EPDCCH set 240, i.e., an EPDCCH set 240 in which the corresponding codeword x may successfully be detected as the correct order of signature sequences is detected in the PRB pairs 250-0, 250-1, 250-2, 250-3, 250-4, 250-5, 250-6, 250-7 forming the EPDCCH set 240. This feature has the twofold advantage of significantly reducing the number of EPDCCH blind detection attempts and, for distributed EPDCCH transmission, to approach the ideal EPDCCH detection performance of pure blind detection. Furthermore, the possible configurations of K signature sequences that may be accommodated in a set 240 of N PRB pairs 250-0, 250-1, 250-2, 250-3, 250-4, 250-5, 250-6, 250-7 enable different receivers 120 (or groups of receivers 120) to use either the same configuration (i.e., the same codeword) or a different configuration (i.e., a different codeword) according to different embodiments.

In another embodiment, the receiver-specific codeword corresponding to a receiver-specific EPDCCH set 240 may be the same for all receivers 120 or a group of receivers 120 for which said EPDCCH set 240 has been configured.

When a group of receivers 120 has been configured with the same EPDCCH set 240, the same signature sequences with the same order may be used for all receivers 120 within said EPDCCH set 240. According to some such embodiments, the reference codeword may be said to be EPDCCH set specific or group-receiver/UE specific.

In another embodiment, the receiver-specific codeword corresponding to a receiver-specific EPDCCH set 240 may be configured semi-statically with higher-layer radio resource control (RRC) signaling.

Multiple receiver-specific EPDCCH sets 240 (from one to six according to some embodiments) may be enabled in some LTE systems, eventually of different size, in terms of PRB pairs 250-0, 250-1, 250-2, 250-3, 250-4, 250-5, 250-6, 250-7, to be semi-statically configured for each receiver 120. In some alternative embodiments, the configuration of the codeword may be done with the same RRC signaling used to configure the associated EPDCCH set 240.

In another embodiment, a 2-symbol alphabet 210, such that $A=\{a_0=0, a_1=1\}$, and therefore two signature sequences, may be used.

Two signature sequences $S=\{s_0, s_1\}$ may be configured for the modulation of reference signals (e.g., DMRS) for all the EPDCCH sets 240 for a receiver 120, then a 2-symbol alphabet 210; $A=\{a_0=0, a_1=1\}$ may be used to encode the order in which the two signature sequences may be used within an EPDCCH set 240 when a control channel signal is actually transmitted within said EPDCCH set 240. The advantage of this approach is that the configuration of signature sequences to use in an EPDCCH set 240 of N PRB pairs 250-0, 250-1, 250-2, 250-3, 250-4, 250-5, 250-6, 250-7 may be encoded in a binary codeword $x=[x_i]_{i=0}^{N-1}$.

In some embodiments, a single signature sequence may be applied to re-modulate receiver-specific reference signals (e.g., DMRS) at fixed time-frequency position within each PRB pair 250-0, 250-1, 250-2, 250-3, 250-4, 250-5, 250-6, 250-7 of an EPDCCH set 240 and in all EPDCCH sets 240 configured.

Using the previous terminology, a 1-symbol alphabet 210 may sufficient to address this case, for instance: $A=\{a_0=1\}$ and the codeword associated to a N-PRB pair EPDCCH set 240 may be a sequence of N ones. The advantage of these embodiments, however, is that once the receiver 120 is signaled the signature sequence to be used, one may avoid signaling the codeword for each of the configured EPDCCH sets 240 as it is implicitly known at the receiver 120.

Figure 3:
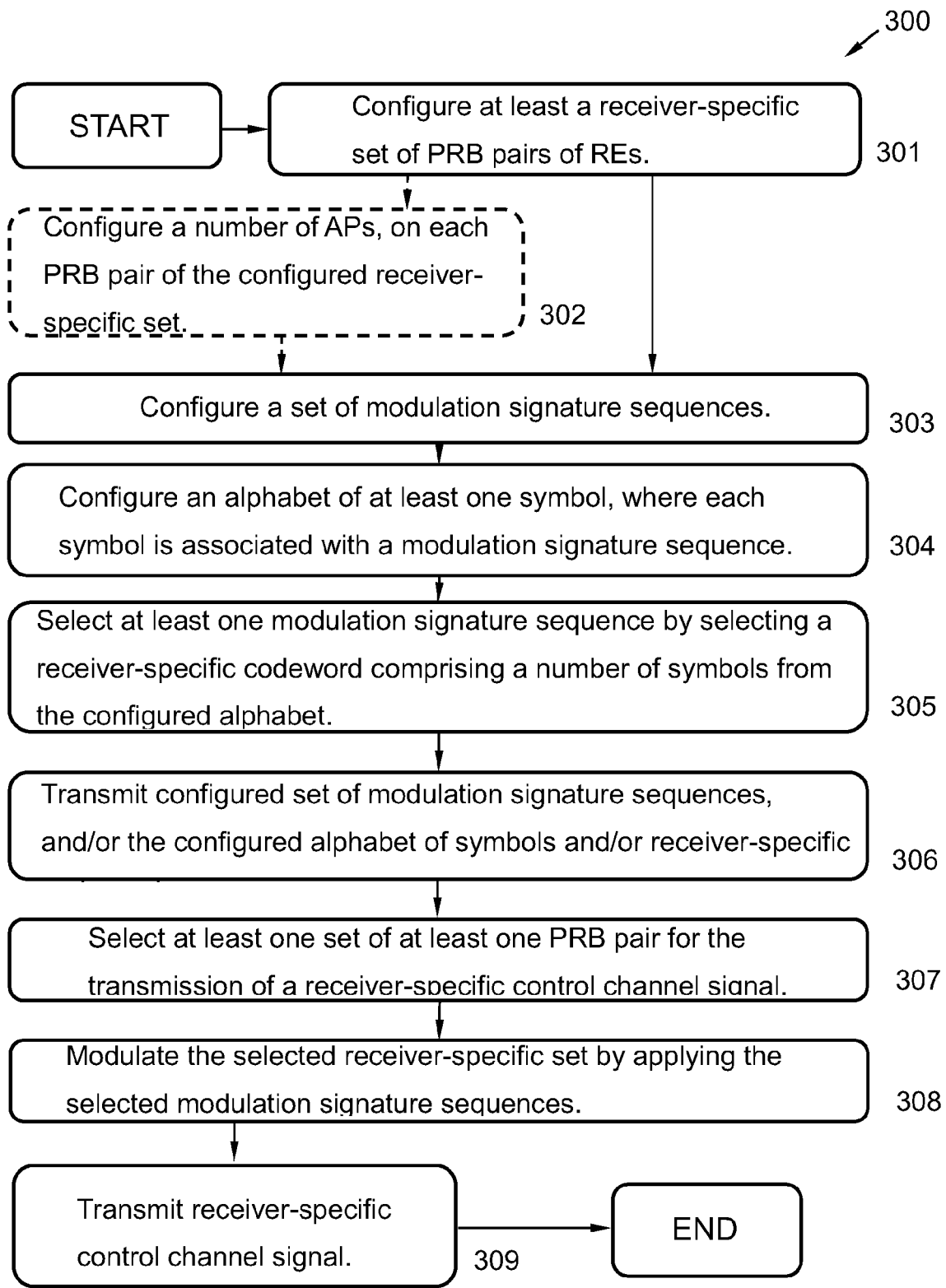
FIG. 3 is a flow chart illustrating a method in a radio network node according to an embodiment of the invention.

FIG. 3 is a flow chart illustrating embodiments of a method 300 for use in a radio network node 110 in a wireless communication system 100. The method 300 aims at communication of a receiver-specific control channel signal within the wireless communication system. The receiver-specific control channel signal is to be received by a receiver 120. The receiver-specific downlink control channel signals are scheduled for transmission over sets 240 of Physical Resource Block, PRB, pairs 250-0, 250-1, 250-2, 250-3, 250-4, 250-5.

Furthermore, the radio network node 110 may comprise an enhanced NodeB in a Long Term Evolution, LTE, system, the receiver 120 may comprise a User Equipment, UE, the downlink control channel may comprise an Enhanced Physical Downlink Control Channel, EPDCCH, the downlink data channel may comprise a Physical Downlink Shared Channel, PDSCH, the receiver-specific set 240 of downlink control channel resources may correspond to an EPDCCH set 240 which may comprise Enhanced Control Channel Elements, ECCEs and/or Enhanced Resource Element Groups, EREGs, according to some embodiments.

The method 300 may be performed in a system based on Time-Division Duplexing (TDD) with and/or without carrier aggregation. However, some embodiments of the method 300 may be performed in Frequency Division Duplexing (FDD) with and/or without carrier aggregation in different embodiments.

According to some alternative embodiments, a single receiver-specific modulation signature sequence may be selected for all sets 240 of Physical Resource Block, PRB, pairs 250-0, 250-1, 250-2, 250-3, 250-4, 250-5, and no codeword has to be explicitly signaled to the receiver 120. According to at least some such embodiments, the codeword may instead be previously known by the receiver 120, or defined in a communication standard or otherwise implicitly known by the receiver 120.

To appropriately communicate the receiver-specific control channel signal, the method 300 may comprise a number of actions 301-309.

It is however to be noted that any, some or all of the described actions 301-309, may be performed in a somewhat different chronological order than the enumeration indicates, or even be performed simultaneously. Further, it may be noted that some actions are optional and may be performed only according to some alternative embodiments, such as e.g. action 302. The method 300 may comprise the following actions:

In action 301, at least one receiver-specific set 240 of at least one PRB pair 250-0, 250-1, 250-2, 250-3, 250-4, 250-5 of time-frequency Resource Elements, REs, is configured.

Action 302 may be comprised within some alternative embodiments of the method 300, but not necessarily within all embodiments. A number of Antenna Ports, APs, on each at least one PRB pair 250-0, 250-1, 250-2, 250-3, 250-4, 250-5 of the configured 301 receiver-specific set 240 may be configured.

Furthermore, according to at least some such embodiments, a unique index mapping may be associated with the position of a symbol in the codeword to an Antenna Port of said configured number of antenna ports on an individual PRB pair 250-0, 250-1, 250-2, 250-3, 250-4, 250-5 within said configured 301 receiver-specific set 240.

In action 303, a set 220 of modulation signature sequences is configured.

In action 304, an alphabet 210 of at least one symbol is configured. Each symbol in the alphabet 210 is associated with a modulation signature sequence in the configured 303 set 220 of modulation signature sequences.

According to some alternative embodiments, a two symbol alphabet 210 and two signature sequences may be used.

In action 305, at least one modulation signature sequence is selected by selecting a receiver-specific codeword comprising a number of symbols from the configured 304 alphabet 210.

The selection of the modulation signature sequence may in some embodiments be performed by selecting a receiver-specific codeword of symbols from an alphabet 210 of a plurality of symbols, where each symbol of said alphabet 210 may be associated with a different modulation signature sequence, and a unique index mapping associates the position of each symbol in said codeword to an individual PRB pair 250-0, 250-1, 250-2, 250-3, 250-4, 250-5 within said configured 301 receiver-specific set 240.

In action 306, any, some, or all of: the configured 303 set 220 of modulation signature sequences, and/or the configured 304 alphabet 210 of symbols are transmitted, to be received by the receiver 120.

According to some embodiments, the selected receiver-specific codeword may be transmitted, to be received by the receiver 120.

The transmission of the receiver-specific codeword may be made over Radio Resource Control, RRC, signaling according to some embodiments.

In action 307, the at least one set 240 of at least one PRB pair 250-0, 250-1, 250-2, 250-3, 250-4, 250-5 is selected for the transmission of a receiver-specific control channel signal.

In action 308, the selected 307 at least one receiver-specific set is modulated by applying the selected 305 at least one modulation signature sequence.

In action 309, the receiver-specific control channel signal comprising the modulated 308 receiver-specific set 240 of the at least one PRB pair 250-0, 250-1, 250-2, 250-3, 250-4, 250-5 is transmitted.

Figure 4:
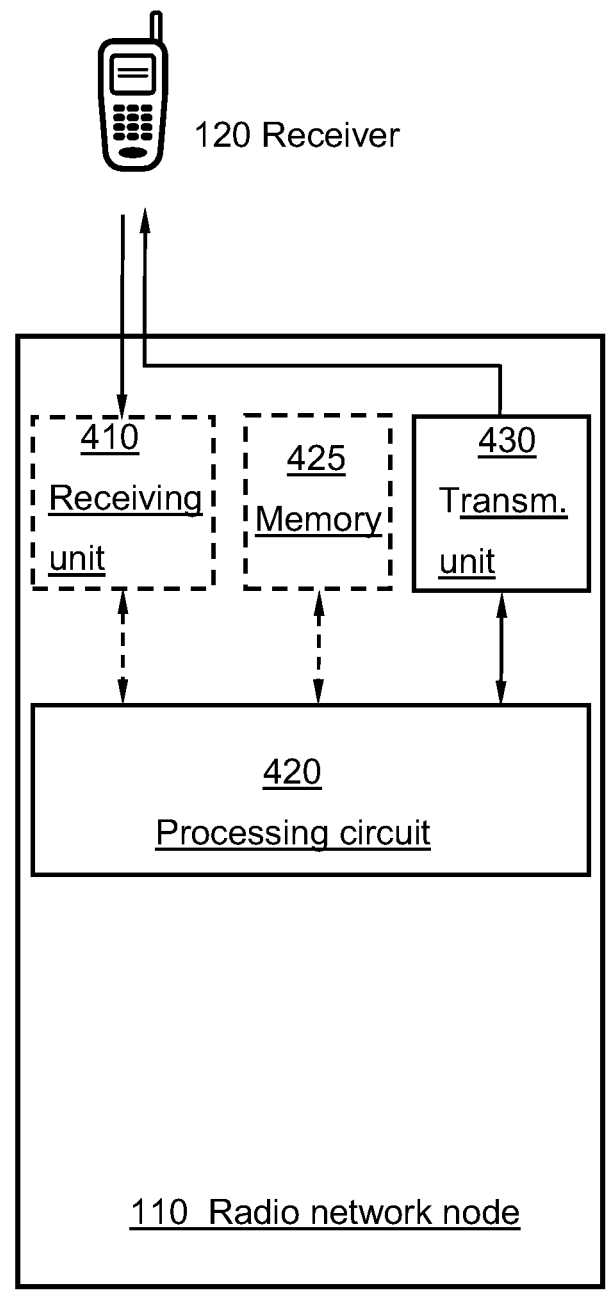
FIG. 4 is a block diagram illustrating a radio network node according to an embodiment of the invention.

FIG. 4 is a block diagram illustrating a radio network node 110 in a wireless communication system 100. The radio network node 110 is configured for performing at least some of the actions 301-309 for communication of a receiver-specific control channel signal within the wireless communication system 100, to be received by a receiver 120. The receiver-specific downlink control channel signals are scheduled for transmission over sets 240 of Physical Resource Block, PRB, pairs 250-0, 250-1, 250-2, 250-3, 250-4, 250-5.

Furthermore, the radio network node 110 may comprise an enhanced NodeB in a Long Term Evolution, LTE, system 100, the receiver 120 may comprise a User Equipment, UE, the downlink control channel may comprise an Enhanced Physical Downlink Control Channel, EPDCCH, the downlink data channel may comprise a Physical Downlink Shared Channel, PDSCH, the receiver-specific set 240 of downlink control channel resources may correspond to an EPDCCH set 240 which may comprise Enhanced Control Channel Elements, ECCEs and/or Enhanced Resource Element Groups, EREGs, according to some embodiments.

The radio network node 110 may in addition be performed in a wireless communication system 100 based on Time-Division Duplexing (TDD) in some embodiments, with and/or without carrier aggregation. However, some embodiments of the radio network node 110 may in addition be performed in a wireless communication system 100 based on Frequency Division Duplexing (FDD), with and/or without carrier aggregation in different embodiments.

The radio network node 110 is configured to perform the different embodiments of the above described method 300 according to any, some or all of the actions 301-309 for communication of the receiver-specific control channel signal within the wireless communication system 100.

For enhanced clarity, any internal electronics or other components of the radio network node 110, not completely indispensable for understanding the herein described embodiments has been omitted from FIG. 4.

The radio network node 110 may comprise a processing circuit 420. The processing circuit 420 may be adapted for configuring at least one receiver-specific set 240 of at least one PRB pair 250-0, 250-1, 250-2, 250-3, 250-4, 250-5 of time-frequency Resource Elements, REs. Further, the processing circuit 420 is adapted for configuring a set 220 of modulation signature sequences. Additionally, the processing circuit 420 is adapted for configuring an alphabet 210 of at least one symbol, where each symbol in the alphabet 210 is associated with a modulation signature sequence in the configured set 220 of modulation signature sequences. Also, furthermore, the processing circuit 420 is in addition adapted for selecting at least one modulation signature sequence by selecting a receiver-specific codeword comprising a number of symbols from the configured alphabet 210. In a further addition, the processing circuit 420 is additionally adapted for modulating the configured receiver-specific set 240 by applying the specified set 220 of modulation signature sequences.

The processing circuit 420 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilized expression "processing circuit" may thus represent a processing circuitry comprising a plurality of processing circuits, such as e.g. any, some or all of the ones enumerated above.

The processing circuit 420 may further perform data processing functions for inputting, outputting, and processing of data comprising data buffering and device control functions, such as call processing control, user interface control, or the like.

The processing circuit 420 may further be configured for selecting the modulation signature sequences by selecting a receiver-specific codeword of symbols from an alphabet 210 of a plurality of symbols, where each symbol of said alphabet 210 is associated with a different modulation signature sequence, and a unique index mapping associates the position of each symbol in said codeword to an individual PRB pair 250-0, 250-1, 250-2, 250-3, 250-4, 250-5 within said configured receiver-specific set 240, according to some embodiments.

In further addition, the processing circuit 420 may in addition be further adapted for configuring a number of Antenna Ports, APs, on each at least one PRB pair 250-0, 250-1, 250-2, 250-3, 250-4, 250-5 of the configured receiver-specific set 240. In addition, the processing circuit 420 may in some embodiments be configured for performing a unique index mapping that is associated with the position of a symbol in the codeword to an Antenna Port of said configured number of antenna ports on an individual PRB pair 250-0, 250-1, 250-2, 250-3, 250-4, 250-5 within said configured receiver-specific set 240.

The radio network node 110 may comprise a transmitting unit 430. The transmitting unit 430 may be adapted for transmitting the specified set 220 of modulation signature sequences, and/or the configured alphabet 210 of symbols. In some embodiments, the transmitting unit 430 may be adapted for transmitting the receiver-specific codeword. In addition, the transmitting unit 430 is furthermore adapted for transmitting the receiver-specific control channel signal comprising the modulated receiver-specific set 240 of the at least one PRB pair 250-0, 250-1, 250-2, 250-3, 250-4, 250-5.

The transmitting unit 430 may be further adapted for transmitting the receiver-specific codeword over Radio Resource Control, RRC, signaling in some embodiments.

In addition, according to some embodiments, the radio network node 110 may comprise a receiving unit 410, configured for receiving radio signals over a wireless interface. The radio signals may be received from e.g. the receiver 120, or any other entity configured for wireless communication according to some embodiments.

Furthermore, the radio network node 110 may comprise at least one memory 425, according to some embodiments. The memory 425 may comprise a physical device utilized to store data or programs i.e. sequences of instructions, on a temporary or permanent basis. According to some embodiments, the memory 425 may comprise integrated circuits comprising silicon-based transistors. Further, the memory 425 may be volatile or non-volatile.

The actions 301-309 to be performed in the radio network node 110 may be implemented through the one or more processing circuits 420 in the radio network node 110, together with computer program code for performing the functions of the actions 301-309. Thus a computer program product, comprising instructions for performing the actions 301-309 in the radio network node 110 may perform communication of a receiver-specific control channel signal within the wireless communication system 100, to be received by a receiver 120, when the instructions of the computer program code are loaded in the processing circuit 420.

The computer program product mentioned above may be provided for instance in the form of a data carrier carrying computer program code for performing at least some of the actions 301-309 according to some embodiments when being loaded into the processing circuit 420. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 110 remotely, e.g. over an Internet or an intranet connection.

Figure 5:
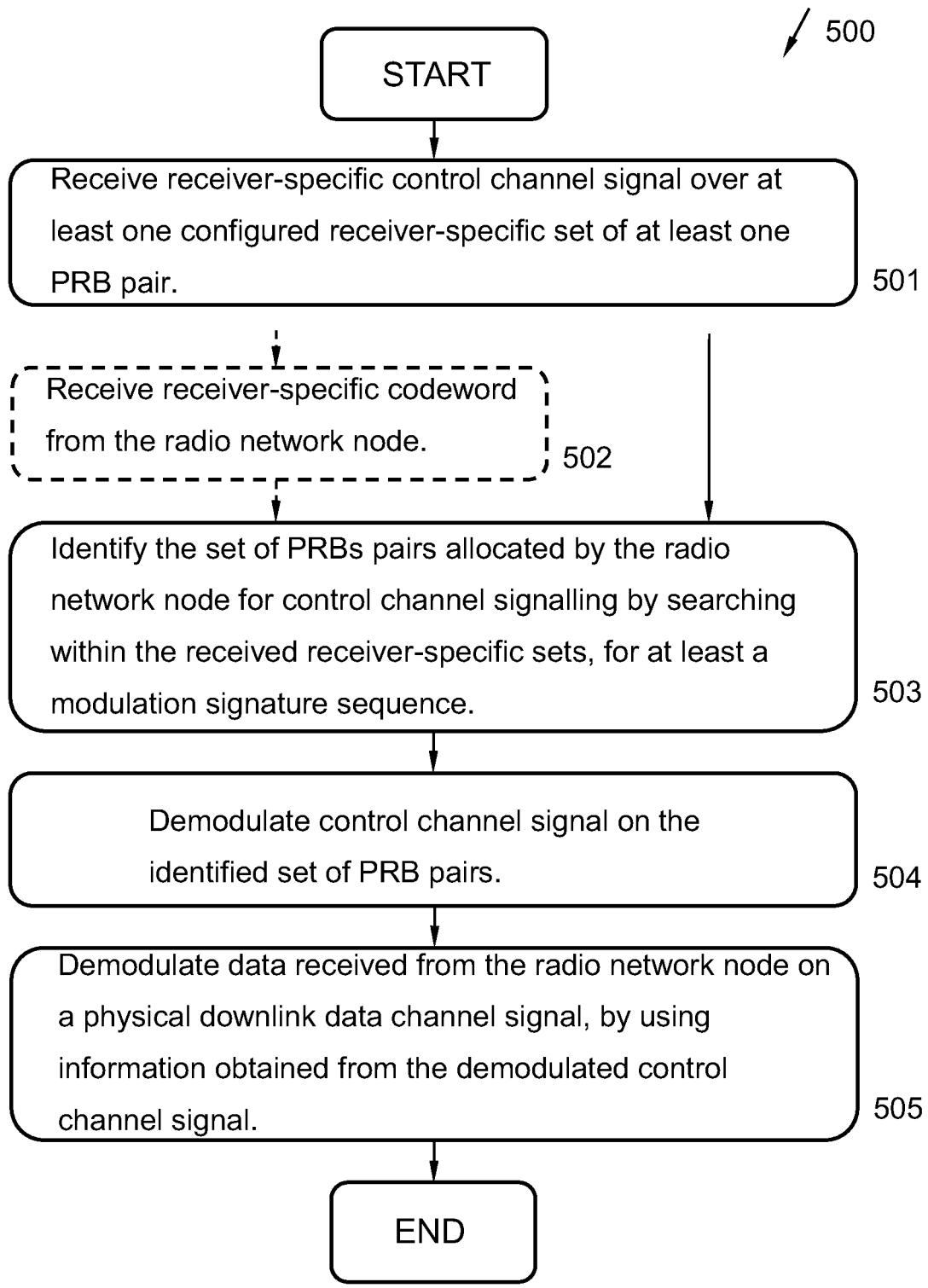
FIG. 5 is a flow chart illustrating a method in a receiver according to an embodiment of the invention.

FIG. 5 is a flow chart illustrating embodiments of a method 500 for use in a receiver 120 in a wireless communication system 100. The method 500 aims at detecting a set 240 of Physical Resource Block (PRB) pairs 250-0, 250-1, 250-2, 250-3, 250-4, 250-5 used for the communication of a receiver-specific control channel signal, received from a radio network node 110.

Furthermore, the radio network node 110 may comprise an enhanced NodeB in a Long Term Evolution, LTE, system, the receiver 120 may comprise a User Equipment, UE, the downlink control channel may comprise an Enhanced Physical Downlink Control Channel, EPDCCH, the downlink data channel may comprise a Physical Downlink Shared Channel, PDSCH, the receiver-specific set 240 of downlink control channel resources may correspond to an EPDCCH set 240 which may comprise Enhanced Control Channel Elements, ECCEs and/or Enhanced Resource Element Groups, EREGs, according to some embodiments.

The method 500 may be performed in a wireless communication system 100 based on Time-Division Duplexing (TDD) with and/or without carrier aggregation. However, some embodiments of the method 500 may be performed in a wireless communication system 100 based on Frequency Division Duplexing (FDD) with and/or without carrier aggregation in different embodiments.

To appropriately perform the reception of the information entity, the method 500 may comprise a number of actions 501-505.

It is however to be noted that any, some or all of the described actions 501-505, may be performed in a somewhat different chronological order than the enumeration indicates, or even be performed simultaneously. Furthermore, some of the described actions may be performed only in some alternative embodiments of the method 500, such as e.g. action 502. The method 500 may comprise the following actions:

In action 501, a receiver-specific control channel signal comprising a modulated receiver-specific set 240 of at least one PRB pair 250-0, 250-1, 250-2, 250-3, 250-4, 250-5 is received. The receiver-specific control channel signal is received from the radio network node 110.

Action 502 may be comprised within some alternative embodiments of the method 500, but not necessarily within all embodiments.

Any, some or all of the receiver-specific codeword, the set 220 of modulation signature sequences, and the configured alphabet 210 of symbols from the radio network node 110 is/are received from the radio network node 110.

The receiver-specific codeword may be received from the radio network node 110 over Radio Resource Control, RRC, signaling according to some embodiments.

In action 503, the configured set 240 of PRBs pairs 250-0, 250-1, 250-2, 250-3, 250-4, 250-5 allocated by the radio network node 110 for control channel signaling is identified by searching within the at least one received 501 receiver-specific set 240 of at least one PRB pair 250-0, 250-1, 250-2, 250-3, 250-4, 250-5 for signature sequences.

According to some embodiments, a two symbol alphabet 210 and two signature sequences are used.

However, according to some embodiments, a single receiver-specific modulation signature sequence has been selected for all sets 240 of Physical Resource Block, PRB, pairs 250-0, 250-1, 250-2, 250-3, 250-4, 250-5 by the radio network node 110, and no codeword has to be explicitly signaled from the radio network node 110. In some such embodiments, the receiver 120 may have a previous knowledge about the codeword, and/or the codeword may be pre-determined.

According to some embodiments, the identification of the configured set 240 of PRBs pairs 250-0, 250-1, 250-2, 250-3, 250-4, 250-5 allocated by the radio network node 110 for control channel signaling may comprise the sub actions of decomposing all received time-frequency resources within a subframe into subcarriers with corresponding modulation symbols. Further the identification of the configured set 240 further may comprise selecting one set of the received configured receiver-specific sets 240 and may also comprise selecting the associated receiver-specific codeword. Also, the identification may comprise detecting whether the configured set 240 of PRBs pairs 250-0, 250-1, 250-2, 250-3, 250-4, 250-5 allocated by the radio network node 110 is potentially transmitted in the selected set of the received configured receiver-specific sets 240. Furthermore, the identification may comprise detecting the configured set 240 in each of the detected candidate sets in some embodiments.

In action 504, the identified set 503 control channel signal is demodulated.

In action 505, the data received from the radio network node 110 on a physical downlink data channel signal is demodulated, by using information obtained from the demodulated 504 control channel signal.

Figure 6:
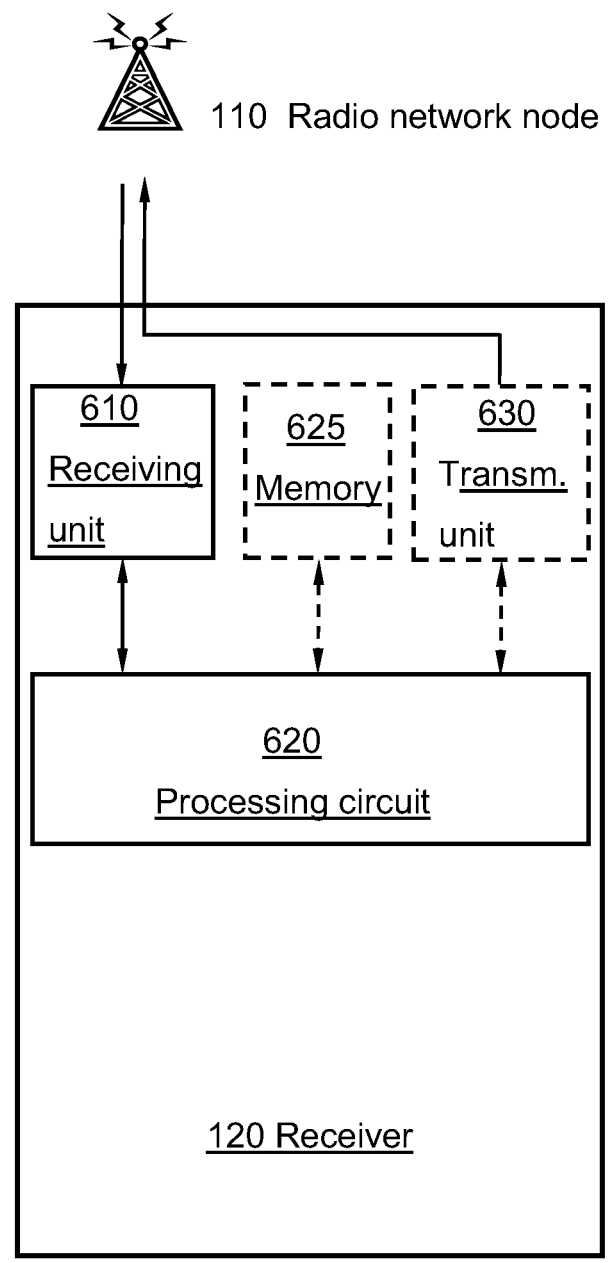
FIG. 6 is a block diagram illustrating a receiver according to an embodiment of the invention.

FIG. 6 is a block diagram illustrating a receiver 120 in a wireless communication system 100. The receiver 120 is configured for detecting a set 240 of PRB pairs 250-0, 250-1, 250-2, 250-3, 250-4, 250-5 used for the communication of a receiver-specific control channel signal, which is received from the radio network node 110.

Furthermore, the radio network node 110 may comprise an enhanced NodeB in a Long Term Evolution, LTE, wireless communication system 100, the receiver 120 may comprise a User Equipment, UE, the downlink control channel may comprise an Enhanced Physical Downlink Control Channel, EPDCCH, the downlink data channel may comprise a Physical Downlink Shared Channel, PDSCH, the receiver-specific set 240 of downlink control channel resources may correspond to an EPDCCH set 240 which may comprise Enhanced Control Channel Elements, ECCEs and/or Enhanced Resource Element Groups, EREGs, according to some embodiments.

The receiver 120 may be configured for performing the method 500 in a wireless communication system 100 based on Time-Division Duplexing (TDD) with and/or without carrier aggregation. However, some embodiments of the method 500 may be performed in a wireless communication system 100 based on Frequency Division Duplexing (FDD) with and/or without carrier aggregation in different embodiments.

In some embodiments, the receiver 120 may be configured for a single receiver-specific modulation signature sequence that has been selected for all sets 240 of Physical Resource Block, PRB, pairs 250-0, 250-1, 250-2, 250-3, 250-4, 250-5 by the radio network node 110, and no codeword has to be explicitly signaled from the radio network node 110.

Furthermore, in some embodiments, the receiver 120 may be configured for performing a method embodiment wherein a two symbol alphabet 210 and two signature sequences may be used.

The receiver 120 is configured to perform any, some or all of the actions 501-505 for detecting the set 240 of Physical Resource Block, PRB, pairs 250-0, 250-1, 250-2, 250-3, 250-4, 250-5 used for the communication of the receiver-specific control channel signal.

For enhanced clarity, any internal electronics or other components of the receiver 120, not completely indispensable for understanding the herein described embodiments has been omitted from FIG. 6.

The receiver 120 comprises a receiving unit 610, adapted for receiving a receiver-specific control channel signal comprising a modulated receiver-specific set 240 of at least one PRB pair 250-0, 250-1, 250-2, 250-3, 250-4, 250-5.

Furthermore, the receiving unit 610 may further be adapted for receiving any, some or all of the receiver-specific codeword, the set 220 of modulation signature sequences, and the configured alphabet 210 of symbols from the radio network node 110, according to some embodiments.

Also, the receiving unit 610 may be further adapted for receiving the receiver-specific codeword from the radio network node 110 over Radio Resource Control (RRC) signaling.

Further, the receiver 120 comprises a processing circuit 620, adapted for identifying the configured set 240 of PRBs pairs 250-0, 250-1, 250-2, 250-3, 250-4, 250-5 allocated by the radio network node 110 for control channel signaling by searching within the at least one received receiver-specific set 240 of at least one PRB pair 250-0, 250-1, 250-2, 250-3, 250-4, 250-5. Additionally, the processing circuit 620, is further adapted for demodulating the identified control channel signal. Also, in addition the processing circuit 620 is furthermore adapted for demodulating data received from the radio network node 110 on a physical downlink data channel signal, by using information obtained from the demodulated control channel signal.

According to some optional embodiments, the processing circuit 620 may be further adapted for identifying the set 240 of PRBs pairs 250-0, 250-1, 250-2, 250-3, 250-4, 250-5 allocated by the radio network node 110 for control channel signaling by decomposing all received time-frequency resources within a subframe into subcarriers with corresponding modulation symbols. Also, the processing circuit 620 may be further adapted for identifying the set 240 by selecting one set of the received configured receiver-specific sets 240 and also selecting the associated receiver-specific codeword. Further, the processing circuit 620 may be further adapted for detecting whether the set 240 of PRBs pairs 250-0, 250-1, 250-2, 250-3, 250-4, 250-5 allocated by the radio network node 110 has been potentially transmitted in the set 240 of the received configured receiver-specific sets. Also, the processing circuit 620 may be further adapted for detecting the set 240 in each of the detected candidate sets, according to some embodiments.

The processing circuit 620 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilized expression "processing circuit" may thus represent a processing circuitry comprising a plurality of processing circuits, such as e.g. any, some or all of the ones enumerated above.

The processing circuit 620 may further perform data processing functions for inputting, outputting, and processing of data comprising data buffering and device control functions, such as call processing control, user interface control, or the like.

Furthermore, the receiver 120 comprises a transmitting unit 630, configured for transmitting signals such as e.g. HARQ feedback, to be received by the radio network node 110.

Furthermore, the receiver 120 may comprise at least one memory 625, according to some embodiments. The memory 625 may comprise a physical device utilized to store data or programs i.e. sequences of instructions, on a temporary or permanent basis. According to some embodiments, the memory 625 may comprise integrated circuits comprising silicon-based transistors. Further, the memory 625 may be volatile or non-volatile.

The actions 501-505 to be performed in the receiver 120 may be implemented through one or more processing circuits 620 in the receiver 120, together with computer program code for performing the functions of the actions 501-505. Thus a computer program product, comprising instructions for performing the actions 501-505 in the receiver 120 may detect a set 240 of Physical Resource Block, PRB, pairs 250-0, 250-1, 250-2, 250-3, 250-4, 250-5 used for the communication of a receiver-specific control channel signal, when the instructions of the computer program code are loaded in the processing circuit 620.

The computer program product mentioned above may be provided for instance in the form of a data carrier carrying computer program code for performing at least some of the actions 501-505 according to some embodiments when being loaded into the processing circuit 620. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 120 remotely, e.g. over an Internet or an intranet connection.

The terminology used in the detailed description of the invention as illustrated in the accompanying drawings is not intended to be limiting of the described methods 300, 500, radio network node 110 and receiver 120, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method in a radio network node, for communication of a receiver-specific control channel signal within a wireless communication system, to be received by a receiver, wherein receiver-specific downlink control channel signals are scheduled for transmission over sets of Physical Resource Block (PRB) pairs, the method comprising:

configuring at least one receiver-specific set of at least one PRB pair of time-frequency Resource Elements (REs);
configuring a set of modulation signature sequences;
configuring an alphabet of at least one symbol, wherein each of the at least one symbol in the alphabet is associated with a modulation signature sequence in the configured set of modulation signature sequences;
selecting, for each configured receiver-specific set of at least one PRB pair, at least one modulation signature sequence by selecting a receiver-specific codeword comprising a number of symbols from the configured alphabet;
transmitting at least one of the configured set of modulation signature sequences and the configured alphabet of symbols;
selecting at least one set of at least one PRB pair for the transmission of a receiver-specific control channel signal; modulating the selected at least one receiver-specific set by applying the selected at least one modulation signature sequence; and
transmitting the receiver-specific control channel signal over the at least one modulated receiver-specific set of the at least one PRB pair.

2. The method according to claim 1, wherein the action of selecting the at least one modulation signature sequence is performed by selecting a receiver-specific codeword of symbols from an alphabet of at least one symbol.

3. The method according to claim 2, wherein each symbol of said alphabet is associated with a different modulation signature sequence, and a unique index mapping associates the position of each symbol in said codeword to an individual PRB pair within said configured receiver-specific set.

4. The method according to claim 1, further comprising configuring a number of antenna ports on each at least one PRB pair of the configured receiver-specific set, wherein a unique index mapping is associated with the position of a symbol in the codeword to an antenna port of said configured number of antenna ports on an individual PRB pair within said configured receiver-specific set.

5. The method according to claim 1, wherein the action of transmitting further comprises transmitting the selected receiver-specific codeword.

6. The method according to claim 5, wherein the transmission of the receiver-specific codeword is made over radio resource control (RRC) signaling.

7. The method according to claim 1, wherein a two symbol alphabet and two signature sequences are used.

8. The method according to claim 1, wherein a single receiver-specific modulation signature sequence is selected for all sets of Physical Resource Block, PRB, pairs, and no codeword has to be explicitly signaled to the receiver.

9. The method according to claim 1, wherein the radio network node comprises an enhanced NodeB in a Long Term Evolution (LTE) system, the receiver comprises a User Equipment (UE), the downlink control channel comprises an Enhanced Physical Downlink Control Channel (EPDCCH), the downlink data channel comprises a Physical Downlink Shared Channel (PDSCH), the receiver-specific set of downlink control channel resources corresponds to an EPDCCH set which comprises Enhanced Control Channel Elements (ECCEs) and/or Enhanced Resource Element Groups (EREGs).

10. A radio network node for communication of a receiver-specific control channel signal within a wireless communication system to be received by a receiver, wherein receiver-specific downlink control channel signals are scheduled for transmission over sets of Physical Resource Block (PRB) pairs, the radio network node comprising:
- a processing circuit adapted to configure at least one receiver-specific set of at least one PRB pair of time-frequency Resource Elements (REs), configure a set of modulation signature sequences, configure an alphabet of at least one symbol, wherein each symbol in the alphabet is associated with a modulation signature sequence in the configured set of modulation signature sequences, select, for each configured receiver-specific set of at least one PRB pair, at least one modulation signature sequence by selecting a receiver-specific codeword comprising a number of symbols from the configured alphabet, select at least one set of at least one PRB pair for the transmission of a receiver-specific control channel signal, and modulate the configured receiver-specific set by applying the configured set of modulation signature sequences; and
- a transmitting unit adapted to transmit at least one of the selected receiver-specific codeword, the configured set of modulation signature sequences, and the configured alphabet of symbols, and transmit the receiver-specific control channel signal over the modulated receiver-specific set of the at least one PRB pair.

11. The radio network node according to claim 10, wherein the processing circuit is adapted to select the at least one modulation signature sequences by selecting a receiver-specific codeword of symbols from an alphabet of a plurality of symbols.

12. The radio network node according to claim 11, wherein each symbol of said alphabet is associated with a different modulation signature sequence, and a unique index mapping associates the position of each symbol in said codeword to an individual PRB pair within said configured receiver-specific set.

13. A method in a receiver, for detecting a set of Physical Resource Block (PRB) pairs used for the communication of a receiver-specific control channel signal comprising:
- receiving a receiver-specific control channel signal over a modulated receiver-specific set of at least one PRB pair;
- identifying the selected set of PRBs pairs allocated by the radio network node for control channel signaling by searching within the at least one received receiver-specific set of at least one PRB pair for signature sequences;
- demodulating control channel signal in the identified set;
- demodulating data received from the radio network node on a physical downlink data channel signal by using information obtained from the demodulated control channel signal and
- receiving at least one of the receiver-specific codeword, the set of modulation signature sequences, and the configured alphabet of symbols from the radio network node.

14. A receiver for detecting a set of Physical Resource Block (PRB) pairs used for the communication of a receiver-specific control channel signal comprising:
- a receiving unit adapted for receiving a receiver-specific control channel signal over a modulated receiver-specific set of at least one PRB pair;
- and a processing circuit adapted for identifying the selected set of PRBs pairs allocated by the radio network node for control channel signaling by searching within the at least one received receiver-specific set of at least one PRB pair;
- further adapted for demodulating the identified control channel signal; and furthermore adapted for demodulating data received from the radio network node on a physical downlink data channel signal, by using information obtained from the demodulated control channel signal and
- wherein the receiving unit is further adapted for receiving at least one of the receiver-specific codeword, the set of modulation signature sequences, and the configured alphabet of symbols from the radio network node.

15. The receiver according to claim 14, wherein the receiving unit is further adapted for receiving the receiver-specific codeword from the radio network node over Radio Resource Control (RRC) signaling.

* * * * *